United States Patent Office 2,987,512
Patented June 6, 1961

2,987,512
PROCESS FOR TREATING HYDROCARBON PHOSPHORUS SULFIDE REACTION PRODUCTS
Jackson W. Wisner, Wappingers Falls, Roger G. Lacoste, Glenham, and Herman D. Kluge, Fishkill, N.Y., assignors to Texaco Inc., a corporation of Delaware
No Drawing. Filed July 25, 1958, Ser. No. 750,874
12 Claims. (Cl. 260—139)

This invention relates to an improved process for preparing phosphorus sulfide-hydrocarbon reaction products. More particularly, this invention is directed to the use of synthetic adsorbents to remove inorganic phosphorus acids from hydrolyzed phosphorus sulfide-hydrocarbon reaction products.

Metal salts formed by neutralization of phosphorus sulfide-hydrocarbon reaction products are known to be excellent motor oil additives wherein they act as detergents and dispersants. The preparation of neutralized phosphorus, sulfide-hydrocarbon reaction products and their use in lubricant compositions are disclosed in U.S. Patents 2,316,080 and 2,316,082 which issued April 6, 1943, to C. M. Loane et al.

When metal-hydrocarbon-phosphorus sulfide containing lubricants were employed in high temperature lubrication, it was discovered that high wear and engine deposits were occasionally encountered. Investigation revealed that the undesirable wear and engine deposits were caused by the presence of salts of inorganic phosphorus acids formed during the neutralization of the phosphorus sulfide-hydrocarbon reaction products. U.S. 2,688,612 which issued September 7, 1954, to R. W. Watson, disclosed that a substantial improvement in the quality of the metal-hydrocarbon-phosphorus sulfide reaction product was obtained by treating the hydrolyzed phosphorus sulfide-hydrocarbon reaction product prior to neutralization with an alkaline adsorbent clay whereby inorganic phosphorus acids formed during the hydrolysis were removed. Alkaline adsorbent clays employed in the afore-identified patent for removal of inorganic phosphorus acids are fuller's earth, diatomaceous earth, bentonite, magnesite, bauxite and Attapulgus clay. The present invention involves the discovery that a particular class of synthetic adsorbents are substantially superior to the alkaline adsorbent clays disclosed in the Watson patent for removing inorganic phosphorus acids from hydrolyzed phosphorus sulfide-hydrocarbon reaction products.

In accordance with the present invention, a hydrolyzed hydrocarbon-phosphorus sulfide reaction product is contacted with synthetic hydrous alkaline earth metal or magnesium silicates at a temperature between 100 and 500° F. to remove inorganic phosphorus acids formed during hydrolysis. Hydrolysis of the phosphorus sulfide-hydrocarbon reaction product and adsorption of the inorganic phosphorus acids by the synthetic hydrous alkaline earth metal and magnesium silicates may be effected in a one-step operation. Neutralization of the hydrolyzed phosphorus sulfide-hydrocarbon reaction product treated with synthetic hydrous magnesium and alkaline earth metal silicates in accordance with the process of the invention gives a lubricant additive free from deleterious salts of inorganic phosphorus acids and characterized by wear-free and deposit-free performance.

The synthetic silicates effective in the process of this invention are hydrous magnesium silicate, hydrous calcium silicate, hydrous barium silicate, and hydrous strontium silicate. Hydrous magnesium, calcium and barium silicates are generally employed in the process of the invention because of their lower cost and availability.

It is necessary that the synthetic silicates have a hydrous nature, i.e., retain water of hydration, in order to be effective in removing inorganic phosphorus acids from the hydrolyzed phosphorus sulfide-hydrocarbon reaction products. Anhydrous magnesium and alkaline earth metal silicates such as calcined synthetic magnesium silicate are ineffective in separating the inorganic phosphorus acids from hydrolyzed phosphorus sulfide-hydrocarbon reaction products.

Synthetic hydrous group III metal silicates such as synthetic hydrous aluminum silicate are also ineffective in separating the inorganic phosphorus acids from hydrolyzed hydrocarbon-phosphorus sulfide reaction products. The specificity of synthetic hydrous magnesium and alkaline earth metal silicates in separating inorganic phosphorus acids is one of the features of this invention.

The synthetic hydrous magnesium and alkaline earth metal silicates differ from the naturally-occurring alkaline adsorbent clays of the Watson Patent 2,688,612 in chemical composition and in their substantial freedom from the traces of iron present in substantially all adsorbent clays. It has been theorized that the superiority of synthetic hydrous silicates over the prior art natural clays in the treatment of hydrolyzed phosphorus sulfide-hydrocarbon reaction products is due at least in part to the absence of trace amounts of iron in the synthetic hydrous silicates.

The advantages of synthetic hydrous silicates over the alkaline adsorbent clays of the Watson patent are threefold.

First, the colors of both the hydrolyzed phosphorus sulfide-hydrocarbon reaction product and the salt resulting from its neutralization are significantly better when synthetic hydrous silicates are employed for removal of inorganic phosphorus acids than when alkaline adsorbent clays are used therefor. Color is an extremely important characteristic of a lubricant additive from the sales standpoint.

Secondly, more rapid filtration rates are realized with synthetic hydrous silicates than with the prior art alkaline adsorbent clays.

Thirdly, synthetic hydrous silicates are more efficient in removing inorganic phosphorus acids from hydrolyzed phosphorus sulfide-hydrocarbon reaction products than the prior art alkaline adsorbents. This advantage permits smaller dosages of adsorbent in the treating step and also makes feasible combination of the hydrolysis and adsorbent-treating steps into one operation as will be brought out in more detail hereafter.

The dosage of the synthetic hydrous magnesium and alkaline earth metal silicates employed in the process of the invention is most conveniently expressed as a weight percentage of the phosphorus sulfide reactant since it is the source of the inorganic phosphorus acid. It has been discovered that best results are obtained by treating the phosphorus sulfide-hydrocarbon reaction product with an amount of synthetic hydrous silicate equivalent to 20 to 120 weight percent of the phosphorus sulfide reactant. The lower limit of 20 weight percent is necessary to effect removal of the inorganic phosphorus acids formed during hydrolysis and the upper limit is set by practical considerations since higher dosages only create handling problems. The preferred concentration of adsorbent is 40 to 105 weight percent of the phosphorus sulfide reactant.

As disclosed in the afore-identified patents, any liquid hydrocarbon reacts with phosphorus sulfides to form phosphorus and sulfur-containing reaction products. Aliphatic, cycloaliphatic and aryl hydrocarbons as well as alkyl-substituted aryl hydrocarbons and aryl-substituted aliphatic and cycloaliphatic hydrocarbons undergo reaction with phosphorus sulfides to yield phosphorus and sulfur-containing reaction products. Olefinic hydrocarbons are the preferred reactants.

The olefinic reactants are usually of high molecular weight, that is, 12 or more carbon atoms, and are usually obtained by polymerization of low molecular weight olefins. Olefins produced by chlorination and subsequent dehydrochlorination of high molecular weight hydrocarbons in the gas oil and lubricating oil range are also used as the hydrocarbon reactants.

Mono-olefin polymers having average molecular weights between 400 and 10,000 prepared by polymerization of gaseous mono-olefins such as propylene, butylene, isobutylene and the like with Friedel-Crafts type catalysts are the most widely used reagents for reaction with phosphorus sulfide. Copolymers of mono-olefin mixtures such as a propylene-isobutylene copolymer, and an isobutylene-pentene copolymer, also find extensive use in the preparation of phosphorus and sulfur-containing hydrocarbon-phosphorus sulfide reaction products. Copolymers of conjugated dienes and mono-olefins such as copolymers of butadiene and isobutylene, of butadiene and propylene, and of butadiene and pentene may also be used as the hydrocarbon reactant.

Olefinic hydrocarbon reactants may also be obtained by cracking of high molecular weight hydrocarbon fractions such as lubricating oil and paraffin waxes in the presence of solid cracking catalysts.

Although phosphorus sulfides such as $P_4S_5$, $P_4S_3$ and $P_4S_7$ are reacted with hydrocarbons to form phosphorus and sulfur-containing reaction products usable in the process of the invention, phosphorus pentasulfide, $P_2S_5$, is used in substantially all commercial preparations because of its availability and cost.

Reaction of the hydrocarbon and the phosphorus sulfide, generally $P_2S_5$, is effected at a temperature from about 150 to 600° F. and usually at a temperature between 300 and 500° F. Advantageously, the reaction is effected under a blanket of an inert gas, for example, in an atmosphere of nitrogen. The phosphorus pentasulfide reagent is employed in an amount between 5 to about 40 weight percent of the hydrocarbon reactant. On a molar basis, the hydrocarbon and phosphorus pentasulfide are usually present in the reaction mixture in amounts between 1 to 3 mols of hydrocarbon per mol of phosphorus pentasulfide. We have found that the preferred mol ratio of hydrocarbon to phosphorus pentasulfide is 1 to 2 mols of hydrocarbon per mol of $P_2S_5$.

When the reaction of the phosphorus pentasulfide and the hydrocarbon is complete, a diluent oil is usually added thereto prior to hydrolysis of the reaction product and its treatment with the synthetic hydrous magnesium silicate adsorbent. Since the $P_2S_5$-hydrocarbon reaction product after hydrolysis and adsorbent treating is usually neutralized to give a lubricating oil additive, a lubricating oil fraction, advantageously a paraffin base lubricating oil, is generally employed as the diluent. Other hydrocarbon fractions such as kerosene and gas oil fractions can be used as diluents, but their use necessitates a subsequent separation step if the neutralized $P_2S_5$-hydrocarbon reaction product is employed as a lubricant additive.

Hydrolysis of the $P_2S_5$-hydrocarbon reaction product is effected by contact with steam at a temperature between 240 and 550° F. and preferably at a temperature between 350 and 450° F.

The treatment of the hydrolyzed reaction product with synthetic hydrous magnesium silicate is effected either subsequent to the hydrolysis step or in conjunction therewith.

In the modification involving simultaneous hydrolysis and adsorbent contact, 20 to 120 weight percent synthetic hydrous magnesium or alkaline earth metal silicate based on the weight of the $P_2S_5$ reactant is mixed with the lubricating oil concentrate of $P_2S_5$-hydrocarbon reaction product and temperature raised to 240–450° F. Steam is passed through the slurry of adsorbent and lubricating oil concentrate of reaction product until the reaction mixture shows constant acidity. The passage of steam through the adsorbent-containing lubricating oil concentrate provides the desired mixing for efficient contact. The preferred temperature range for the simultaneous hydrolysis-adsorbent treating operation is 300 to 400° F.

If the treatment with synthetic hydrous silicate is effected as a separate step subsequent to the hydrolysis, the hydrolyzed reaction product is contacted with an amount of adsorbent similar to that used in the above-described simultaneous operation and the mixture agitated by steam or with an inert gas at a temperature between 100 and 500° F. and preferably 200 to 400° F. until a product of constant acidity is produced.

Drying of the synthetic hydrous silicate-treated hydrolyzed reaction product is simply effected by passing a stream of an inert gas such as nitrogen therethrough at a temperature between about 220 and 400° F. Filtration of the slurry of adsorbent and lubricating oil concentrate of hydrolyzed $P_2S_5$-hydrocarbon reaction product effects removal of the inorganic phosphorus acids formed during hydrolysis.

The filtrate obtained after separation of adsorbent can be used as a lubricating oil additive per se but is normally neutralized with an alkali metal or alkaline earth metal basic compound to form a metal-hydrocarbon-$P_2S_5$ reaction product characterized by excellent detergent and dispersant properties and freedom from objectionable wear and deposit formation.

The process of the invention is illustrated in the following examples:

EXAMPLE 1

A polybutylene-$P_2S_5$ addition product was prepared by reacting 44 lbs. of a polybutylene having an average molecular weight of about 700 with 7.1 lbs. $P_2S_5$ at 400° F. for 24 hours; the reaction mixture contained approximately 2 mols of olefin per mol of $P_2S_5$. A lubricating oil concentrate having an ASTM Color of 2— was prepared by the addition of 88 lbs. of a paraffin base distillate oil having an SUS at 100° F. of about 100. This product was used in Examples 1 to 6 and 8.

After steaming 2000 g. of this concentrate for 2 hours at 375° F., the neutralization number of the hydrolyzed product was 30. The hydrolyzed product was dried with nitrogen, cooled to 300° F. and treated with 80 g. of synthetic hydrous magnesium silicate equivalent to about 80 weight percent of the $P_2S_5$ reactant. The adsorbent and the concentrate were agitated for two hours by passage of nitrogen therethrough. On filtration there was obtained a clear concentrate having a neutralization number of 13.5 and having an ASTM diluted color of 2—.

1295 g. of the $P_2S_5$ addition product obtained by the above treatment was converted to its barium salt by reaction with 113 g. of barium oxide equivalent to 8.7 weight percent of the total concentrate and 198 g. of $H_2O$ equivalent to 15 mols of $H_2O$ per mol of barium oxide. The reaction mixture was re-heated 1 hour at 200° F. and then 1295 cc. of methyl Cellosolve, a volume equivalent to the weight of the olefin-$P_2S_5$ addition product, was added. The reaction mixture was then warmed slowly to 325° F. with nitrogen blowing whereby water and methyl Cellosolve were removed. The product was then steamed 1 hour at 325° F., dried with nitrogen at a similar temperature and blown with $CO_2$ at 250° F. until neutral whereby excess barium oxide was converted to barium carbonate. The reaction product filtered rapidly to give a clear concentrate having an ASTM diluted color of 2½—; the product analyzed 6.65 percent barium and had a $CO_2$ concentration of 0.98 percent.

To prove the reproducibility of the above results, the reaction sequence was repeated employing the same reaction conditions, and amounts of reactants. On filtration of the hydrolyzed olefin-$P_2S_5$ product to separate the adsorbent after two hours of contact, a concentrate was obtained having a neutralization number of 16.2, an ASTM diluted color of 2—; on reaction with excess barium oxide a product was obtained which filtered rapidly to give a concentrate having a barium metal content of 6.88 percent, a $CO_2$ content of 0.96 and an ASTM diluted color of 2½—.

EXAMPLE 2

Another 2000 g. portion of the polybutylene-$P_2S_5$ reaction product prepared in Example 1 was steamed for two hours to give a product having a neutralization number of 33.8 and then contacted with 80 g. of activated montmorillonite sold under the trade name of Filtrol. After two hours of agitated contact the product had a neutralization number of 23.3 and after five hours a neutralization number of 23.2. On addition of a second 80 g. portion of Filtrol, the neutralization number of the concentrate was finally reduced to 13.4 after another 5 hours of contact. After filtration, the concentrate had an ASTM diluted color of 2—.

1252 g. of the olefin-$P_2S_5$ product was converted to its barium salt employing approximately the same concentrations of barium oxide (116 g.), water (205 g.) and methyl Cellosolve (1200 cc.) and the same procedure employed in Example 1. The sole exception was that the product was blown with $CO_2$ at 300° F. rather than at 250° F. as employed in Example 1. The resulting over-based barium-olefin-$P_2S_5$ reaction product filtered rapidly to give a hazy product. On re-filtration, a concentrate was produced which analyzed 7.04 percent barium metal content and 1.20 weight percent $CO_2$ content and which had an ASTM diluted color of 5—.

EXAMPLE 3

Another 2000 g. portion of the polybutylene-$P_2S_5$ reaction product prepared in Example 1 was steamed for two hours at 375° F. to give a product having a neutralization number of 33.4. The steamed product was contacted with 80 g. of activated montmorillonite sold under the trade name Super Filtrol for two hours. Since the neutralization number was only reduced to 21 after two hours of contact, an additional 80 g. was added and the concentrate subjected to agitated contact for an additional two hours. After filtration, the concentrate had a neutralization number of 17.6 and an ASTM diluted color of 4½—. This product was not converted to the barium salt because of its poor color.

EXAMPLE 4

A 6000 g. portion of the polybutylene-$P_2S_5$ reaction product prepared in Example 1 was steamed for five hours to give a product having a neutralization number of 32.4. The concentrate was then contacted with 240 g. Attapulgus clay, a magnesium-rich fuller's earth comprising mainly magnesium alumina silicate, for three hours, at which point the neutralization number of the product was 19.2 and after five hours a neutralization number of 19. An additional 50 g. of clay was added, agitated contact continued for approximately 3 hours, at which point the neutralization number was reduced to 15.6. On filtration there was obtained a clear distillate having an ASTM diluted color of 3½—.

2000 g. of this olefin-$P_2S_5$ product was converted to a barium salt employing approximately the same concentrations of barium oxide (176 g.), water (311 g.) and methyl Cellosolve (2000 cc.) and the same procedure employed in Example 1. During removal of the solvents by nitrogen blowing, the color of the mixture became dark. $CO_2$ blowing of the steamed and dried reaction product to convert the excess barium oxide to carbonate was effected at 300° F. instead of the 250° F. temperature level employed in Example 1. The resulting product filtered with difficulty to give a concentrate of barium-polyisobutylene-$P_2S_5$ product having an ASTM diluted color of 6—.

EXAMPLE 5

Another 2000 g. portion of the polybutylene-$P_2S_5$ reaction product prepared in Example 1 was steamed for two hours to give a product having a neutralization number of 33.9. The steamed product was contacted with 80 g. of low iron content activated bauxite sold under the trade name Porocel for two hours to give a product having a neutralization number of 25.3. On addition of another 40 g. of Porocel and two extra hours of contact, the product had a neutralization number of 25. An addition of another 40 g. of Porocel and after about three more hours of contact, the neutralization number of the product was reduced to 21.7. The product filtered with difficulty to give a dark-colored concentrate. The barium salt of this product was not prepared because of the color and poor filtration properties of the product.

EXAMPLE 6

Another 2000 g. portion of the polybutylene-$P_2S_5$ product described in Example 1 was steamed for two hours to give a product having a neutralization number of 35.2. The steamed product was contacted with a mixture of 60 g. of Attapulgus clay and 20 g. of magnesium oxide for two hours to give a product having a neutralization number of 11. The product filtered readily to give a concentrate having an ASTM diluted color of 5.

1170 g. of this polybutylene-$P_2S_5$ product was converted to a barium salt employing the same concentration of barium oxide (96 g.), water (170 g.) and methyl Cellosolve (1170 cc.) employed in Example 1 and using the same procedure described therein. The only difference was that the $CO_2$ blowing to convert the excess barium oxide to barium carbonate prior to filtration was effected at 300° F. During preparation, it was observed that the reaction mixture thickened significantly after the addition of the methyl Cellosolve. After the $CO_2$ blowing of the product at 300° F. until it was neutral, a non-filterable gelatinous mixture was formed.

EXAMPLE 7

A polybutylene-$P_2S_5$ reaction product was prepared by reacting polybutylene having an average molecular weight of about 700 and $P_2S_5$ in a ratio of 1.1 mols of olefin per mol of $P_2S_5$ and in the presence of sulfur in an amount equal to 0.5 weight percent of polybutylene. The reaction was effected at 450° F. for four hours in a nitrogen atmosphere. The reaction product was then diluted with a paraffin base distillate having an SUS at 100° F. of about 100 in an amount equivalent to the weight of the polyolefin reactant. The main difference between this preparation and that described in Example 1 was the use of about 1:1 olefin-$P_2S_5$ mol ratio as contrasted with a 2:1 olefin mol ratio employed in Example 1.

A portion of this lubricating oil concentrate was steamed at 375° F. for four hours in a nitrogen atmosphere and then dried by passage of nitrogen therethrough. The hydrolyzed product had a neutralization number of 56.3 and contained about 2500 g. of steamed acid. This product was then treated with 250 g. of synthetic hydrous calcium silicate equivalent to about 108 weight percent of the $P_2S_5$ reactant at a temperature of 300° F. The mixture of concentrate and adsorbent was stirred for 1 hour under a nitrogen atmosphere. On filtration, there was obtained a clear concentrate having a neutralization number of 18.2 and an ASTM diluted color of 2½—.

1 mol of the hydrous calcium silicate treated product was converted to its barium salt by reaction with 3.2 mols of barium oxide and 16.3 mols of water under reflux for ½ hour. 24.4 mols of methyl Cellosolve was then added and the temperature raised to 325° F. to remove water and methyl Cellosolve. At 325° F. the reaction mixture was steamed for ½ hour followed by $CO_2$ blowing until dried. The reaction product filtered rapidly to give a wine red concentrate having an estimated ASTM diluted color of 4; the product analyzed 14.5 percent barium and had a $CO_2$ concentration of 3.01 percent.

The foregoing examples demonstrates the superiority of synthetic hydrous magnesium and calcium silicates over naturally-occurring clays in the treatment of hydrolyzed olefin-$P_2S_5$ products to effect the removal of inorganic phosphorus acids therefrom. In Table I the data from the foregoing examples are summarized in tabular form.

In Example 8 there is shown the modification of the invention wherein steam treatment and contact with the synthetic hydrous magnesium silicate are effected simultaneously.

EXAMPLE 8

Another 200 g. portion of the polybutylene-$P_2S_5$ addition product described in Example 1 was steamed in the presence of 80 g. of synthetic hydrous magnesium silicate at a temperature of 320° F. for two hours at which point the neutralization number was 13.9. After steaming for an additional two hours, the neutralization number was reduced to 10.7. The concentrate of hydrolyzed polybutylene-$P_2S_5$ product obtained on filtration had an ASTM diluted color of 3—.

280 g. of this polybutylene-$P_2S_5$ product was converted to a barium salt by reaction with 13 g. of barium oxide, and 23 g. of $H_2O$ equivalent to 15 mols of water per mol of barium oxide. After heating for 2.5 hours at 200° F., 280 cc. of methyl Cellosolve equivalent to the weight of the olefin-$P_2S_5$ product was added. The mixture was then blown with nitrogen to remove water and the methyl Cellosolve while raising the temperature to about 325° F. After steaming for one hour at 325° F. and drying with nitrogen at 300° F., the product was neutralized by $CO_2$ blowing at 300° F. The reaction product filtered readily to give a concentrate having a barium metal content of 3.64 percent and an ASTM diluted color of 3—.

Calcined synthetic magnesium silicate and synthetic hydrous aluminum silicate were employed for treatment of a hydrolyzed olefin-$P_2S_5$ product similar to that employed in Example 7, that is, prepared from a reaction mixture comprising approximately 1 mol of $P_2S_5$ and 1 mol of polybutylene with an average molecular weight of about 700. Both of these adsorbents were ineffective in separating inorganic phosphorus acid from the hydrolyzed olefin-$P_2S_5$ product as demonstrated by the fact that substantially no reduction in Neut. No. was realized even after prolonged contact at conditions employed in the Examples 1 to 7, that its, temperatures of the order of about 250-350° F.

These results establish the necessity of employing synthetic hydrous magnesium and alkaline earth metal silicate and they also demonstrate the ineffectiveness of group III metal hydrous silicates.

Obviously, many modifications and variations of the invention as hereinbefore set forth may be made without departing from the spirit and scope thereof and, therefore, only such limitations should be imposed as are indicated in the appended claims.

We claim:

1. In a process for preparing a phosphorus- and sulfur-containing hydrocarbon by reaction of a phosphorus sulfide with a hydrocarbon and subsequently hydrolyzing the phosphorus sulfide-hydrocarbon reaction product; the improvement which involves contacting the hydrolyzed phosphorus sulfide-hydrocarbon reaction product with a synthetic silicate, selected from the group consisting of hydrous magnesium and hydrous alkaline earth metal silicates at a temperature between 100 and 500° F. to remove inorganic phosphorus acids formed during hydrolysis.

2. The improvement described in claim 1 in which said synthetic silicate is employed in a concentration equivalent to 20 to 120 weight percent of the phosphorus sulfide reactant.

3. The improvement described in claim 1 in which the hydrolyzed phosphorus sulfide-hydrocarbon reaction product is contacted with synthetic hydrous calcium silicate.

*Table I*

EFFECTIVENESS OF ADSORBENTS IN TREATING HYDROLIZED OLEFIN-$P_2S_5$ PRODUCTS

| Adsorbent | Dosage, Wt. Percent/ $P_2S_5$ | Time, Hrs. | Neut. Nos., Hydrolyzed Product | Neut. Nos., Adsorbent-Treated Product | Color, ASTM Diluted [b] | | Filtration of Barium Salt Concentrate |
|---|---|---|---|---|---|---|---|
| | | | | | Adsorbent-Treated Product | Over-Based Barium Salt | |
| Hydrous Mg. Silicate (Ex. 1) | 80 | 2 | 30 | 15.5 | 2— | 2½ | Rapid. |
| Filtrol (Ex. 2) | 80 | 5 | 33.8 | 23.2 | 2— | 5— | Rapid-Hazy Refilter. |
| | [d] 80 | 5 | | 13.4 | | | |
| Super Filtrol (Ex. 3) | 80 | 2 | 33.4 | 21 | 4½— | Not prepared | |
| | [d] 80 | 2 | | 17.6 | | | |
| Attapulgus Clay (Ex. 4) | 80 | 5 | 32.4 | 19 | 3½— | 6— | Difficult. |
| | [d] 80 | 8 | | 15.6 | | | |
| Porocel (Ex. 5) | 80 | 2 | 33.9 | 25.3 | (a) | Not prepared | |
| | [d] 40 | 2 | | 25 | | | |
| | [d] 40 | 3 | | 21.7 | | | |
| Attapulgus Clay—MgO(3-1) (Ex. 6) | [d] 80 | 2 | 35.2 | 11.0 | 5 | | Gel-Would not filter. |
| Hydrous Ca Silicate (Ex. 7) | 108 | 1 | 56.3 | 18.2 | 2½— | 4 [c] | Rapid. |

[a] Filtration of concentrate to separate adsorbent was difficult.
[b] ASTM Method D155-45T.
[c] Estimated.
[d] Additional dosages.

4. The improvement described in claim 1 in which the hydrolyzed phosphorus sulfide-hydrocarbon reaction product is contacted with synthetic hydrous magnesium silicate.

5. The improvement described in claim 1 in which said hydrolyzed phosphorus sulfide-hydrocarbon reaction product is contacted with synthetic silicate at a temperature between 200 and 400° F.

6. In a proces for preparing a phosphorus and sulfur-containing hydrocarbon by reaction of a $P_2S_5$ with an olefin and subsequently hydrolyzing $P_2S_5$-olefin reaction product; the improvement which comprises contacting the hydrolyzed $P_2S_5$-olefin reaction product with a synthetic silicate selected from the group consisting of hydrous magnesium and hydrous alkaline earth metal silicates at a temperature between 100 and 500° F. to remove inorganic phosphorus acids formed during hydrolysis.

7. A process for preparing a metal salt of a phosphorus sulfide-hydrocarbon reaction product which comprises reacting phosphorus sulfide with a hydrocarbon, hydrolyzing the phosphorus sulfide hydrocarbon reaction product, contacting the hydrolyzed phosphorus sulfide hydrocarbon reaction product with the synthetic silicate selected from the group consisting of hydrous magnesium and hydrous alkaline earth metal silicates at a temperature between 100 and 500° F. to remove inorganic phosphorus acids formed during hydrolysis and converting said silicate-treated product to a metal salt useful as a lubricating oil additive by reaction with an inorganic basic metal compound.

8. A process according to claim 7 in which $P_2S_5$ is reacted with an olefin polymer and said basic metal compound is an alkaline earth metal compound.

9. A process according to claim 7 in which said hydrolyzed phosphorus sulfide-hydrocarbon reaction product is contacted with said synthetic silicate in an amount equivalent to 20 to 120 weight percent of said phosphorus sulfide reactant.

10. A process according to claim 7 in which said synthetic silicate is hydrous magnesium silicate.

11. A process according to claim 7 in which said synthetic silicate is hydrous calcium silicate.

12. A process according to claim 7 in which said hydrolysis of said phosphorus sulfide-hydrocarbon reaction product and contact with said synthetic silicate are effected simultaneously at a temperature between 240 and 450° F.

References Cited in the file of this patent

UNITED STATES PATENTS

| | | |
|---|---|---|
| 2,384,563 | Roseman et al. | Sept. 11, 1945 |
| 2,434,418 | LaLande | Jan. 13, 1948 |
| 2,498,353 | Bierce | Feb. 21, 1950 |
| 2,647,889 | Watson et al. | Aug. 4, 1953 |
| 2,688,612 | Watson | Sept. 7, 1954 |
| 2,759,420 | Watson et al. | Aug. 21, 1956 |